H. T. KINGSBURY.
TROWEL.
APPLICATION FILED MAR. 2, 1915
1,321,055.
Patented Nov. 4, 1919.
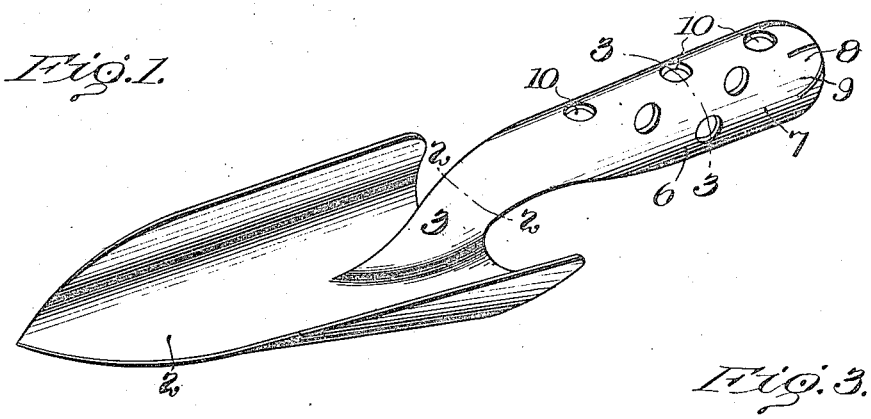
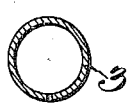
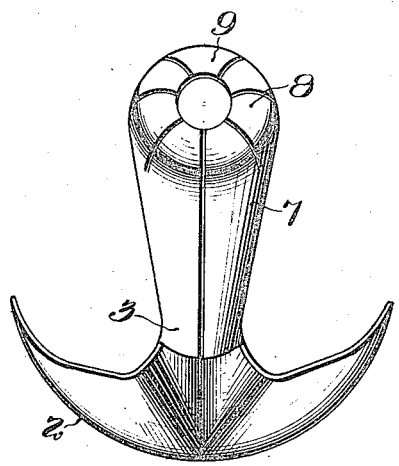
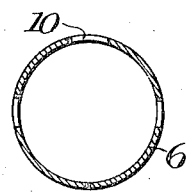
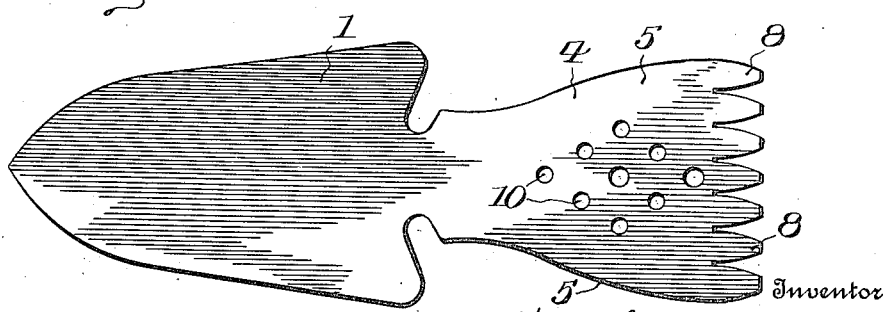
Inventor
Harry T. Kingsbury
By Sturtevant & Mason
Attorney
Witnesses
Grace P. Brereton
B. B. Thompson

UNITED STATES PATENT OFFICE.

HARRY T. KINGSBURY, OF KEENE, NEW HAMPSHIRE.

TROWEL.

1,321,055.   Specification of Letters Patent.   Patented Nov. 4, 1919.

Application filed March 2, 1915. Serial No. 11,550.

*To all whom it may concern:*

Be it known that I, HARRY T. KINGSBURY, a citizen of the United States, residing at Keene, in the county of Cheshire, State of New Hampshire, have invented certain new and useful Improvements in Trowels, of which the following is a description, reference being had to the accompanying drawing, and to the figures of reference marked thereon.

My invention relates to improvements in trowels and more particularly to a garden trowel, the object of the invention being to provide a simple, cheap and effective tool made out of a single blank, having a closed shaped handle formed so as to give a secure grip for the hand of the user which shall be rounded at the end to avoid any sharp edges which would injure the hand of the user in forcing it into the ground.

The invention therefore consists in the matters hereinafter described and referred to in the appended claim.

The invention is illustrated in the accompanying drawings in which;

Figure 1 is a perspective view of a trowel constructed in accordance with my invention;

Fig. 2 is a sectional view on line 2—2 of Fig. 1;

Fig. 3 is a sectional view on line 3—3 of Fig. 1,

Fig. 4 is an end view and

Fig. 5 is a plan view of the blank from which the trowel is made.

In these drawings: 1 represents the blank from which the trowel is made. The blade 2 is concaved as usual. It has the raised V-shaped portion 3 and the portion 4 of the blank forming the handle is curved inwardly as at 5 to form the bellied portion 6 of the handle. The blank is closed on itself to form the shaped closed hollow handle 7. The outer end of the blank portion 4 is kerfed as at 8 and when the handle is formed by closing the blank upon itself these kerfs are bent inwardly to form the rounded end 9 of the handle so as not to leave a sharp edge to hurt the hand of the user in digging into the ground. The portion 4 is also perforated as shown at 10. While I have shown the invention as applied to a garden trowel it will be understood that it is applicable to other tools.

Having thus described my invention, what I claim as new and desire to secure by Letters Patent, is:—

A trowel having a blade and handle formed from one integral piece of metal, the blade being bent into concave form and having a raised V-shaped portion with a handle extending therefrom in tubular form, with the side edges of the metal forming the same abutting and with its outer end rounded and having wedge-shaped extensions, said extensions being bent inwardly to give a hemispherical form to the end of the handle.

In testimony whereof, I affix my signature, in the presence of two witnesses.

HARRY T. KINGSBURY.

Witnesses:
L. G. LITCHFIELD,
W. C. MASON.